US007020668B2

(12) United States Patent
Matsuda et al.

(10) Patent No.: US 7,020,668 B2
(45) Date of Patent: Mar. 28, 2006

(54) DEVICE FOR RETAINING IMPORTANT DATA ON A PREFERENTIAL BASIS

(75) Inventors: Takahiro Matsuda, Kawasaki (JP);
Shoji Suzuki, Kawasaki (JP);
Shigefumi Yamada, Kawasaki (JP);
Masahiro Mori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 226 days.

(21) Appl. No.: 09/823,756

(22) Filed: Apr. 3, 2001

(65) Prior Publication Data

US 2002/0065841 A1 May 30, 2002

(30) Foreign Application Priority Data

Oct. 16, 2000 (JP) .............................. 2000-315084

(51) Int. Cl.
*G06F 12/00* (2006.01)
*G06F 17/30* (2006.01)

(52) U.S. Cl. .............................. 707/206; 707/1; 707/2; 707/204; 707/205; 706/15

(58) Field of Classification Search ................ 707/204, 707/205; 358/426.02, 1.11, 1.9, 426.1; 382/305, 382/306, 232, 239; 711/159, 162, 170
See application file for complete search history.

(56) References Cited

U.S. PATENT DOCUMENTS

| 5,276,867 A | * | 1/1994 | Kenley et al. ............... 707/204 |
| 5,457,776 A | * | 10/1995 | Wong et al. ................. 715/516 |
| 5,564,037 A | * | 10/1996 | Lam ........................... 707/204 |
| 5,829,023 A | * | 10/1998 | Bishop ....................... 711/118 |
| 5,870,534 A | * | 2/1999 | Tsuchitoi .................... 358/1.16 |
| 5,892,847 A | * | 4/1999 | Johnson ...................... 382/232 |
| 5,893,920 A | * | 4/1999 | Shaheen et al. ............. 711/133 |
| 5,991,753 A | * | 11/1999 | Wilde ............................ 707/2 |
| 6,098,064 A | * | 8/2000 | Pirolli et al. ................... 707/2 |
| 6,169,820 B1 | * | 1/2001 | Wade et al. ................. 382/239 |
| 6,246,797 B1 | * | 6/2001 | Castor et al. ............... 382/232 |
| 6,298,173 B1 | * | 10/2001 | Lopresti ..................... 382/305 |
| 6,363,178 B1 | * | 3/2002 | Chiba et al. ................ 382/305 |
| 6,445,460 B1 | * | 9/2002 | Pavley ....................... 358/1.15 |
| 6,564,282 B1 | * | 5/2003 | Torres ............................ 711/1 |
| 6,907,421 B1 | * | 6/2005 | Keshav et al. ................. 707/2 |
| 2002/0002570 A1 | * | 1/2002 | Sakai et al. ................. 707/526 |

FOREIGN PATENT DOCUMENTS

JP 02227750 A * 9/1990
JP A-10-207891 8/1998

OTHER PUBLICATIONS

Gavron et al; "How to Use Microsoft Windows NT 4 Workstation"; 1996; Macmillan Computer Publishing USA; pp. 14,16-17, 33-39, and 54.*

* cited by examiner

*Primary Examiner*—Kim Vu
*Assistant Examiner*—Ponnoreay Pich
(74) *Attorney, Agent, or Firm*—Staas & Halsey LLP

(57) ABSTRACT

Data files in a storage device are ranked in the ascending order of importance. When the storage capacity of the storage device is insufficient for the addition of a new file, the files are deleted automatically in the order of importance beginning with the least important file. Thus, a storage space for the new file is reserved.

11 Claims, 25 Drawing Sheets

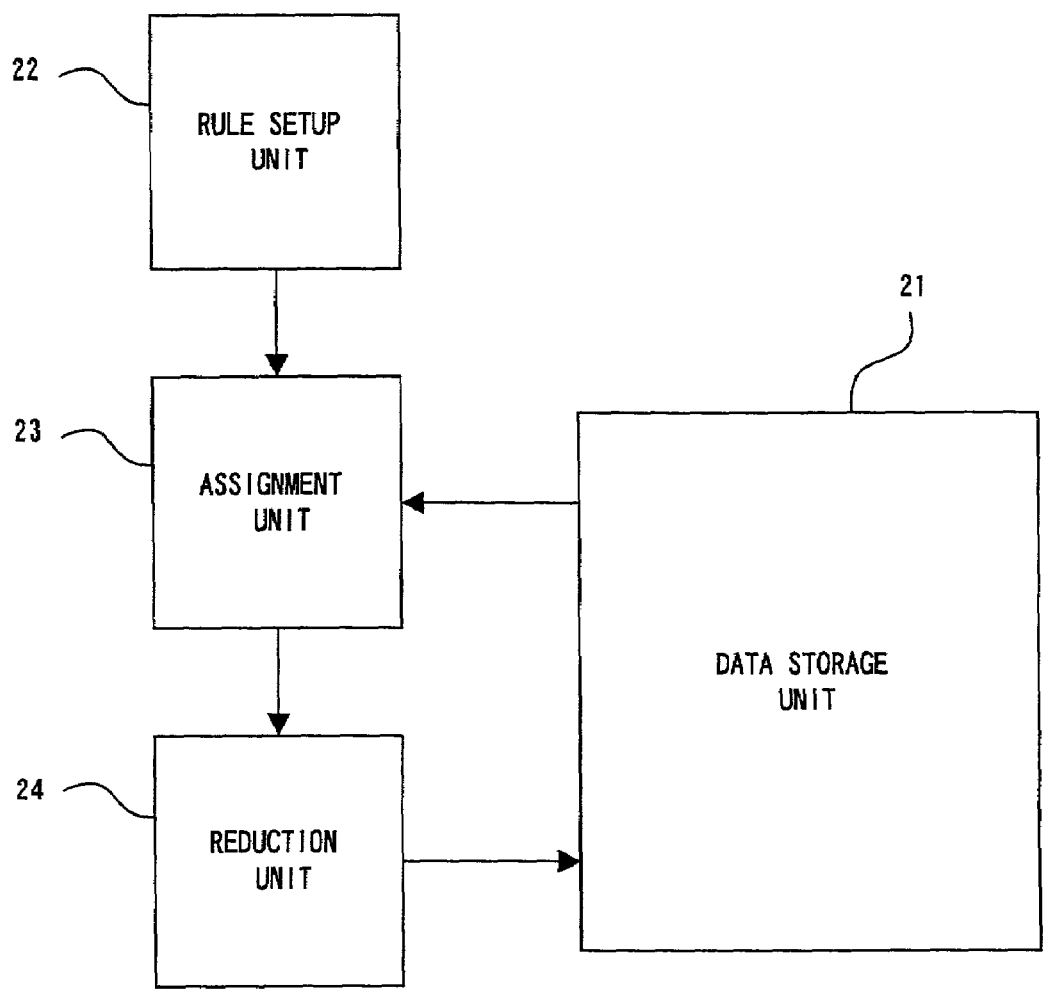
F I G. 2A

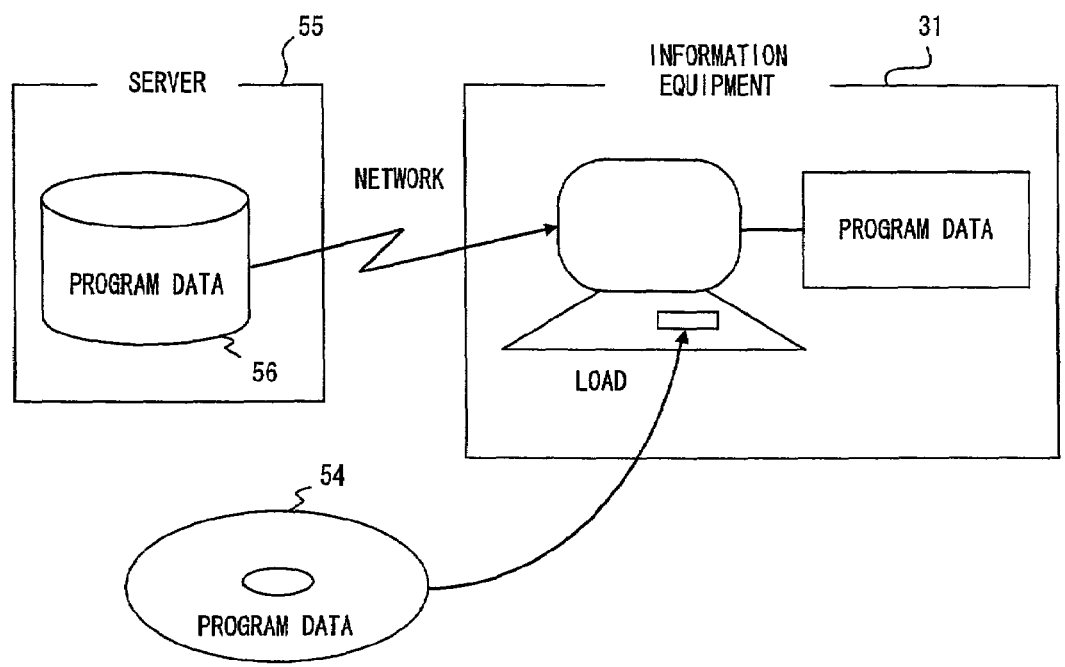
F I G. 4

| ATTRIBUTE | VALUE |
|---|---|
| FILE NAME | FILE1 |
| CREATION DATE | 1999/03/27 |
| LAST ACCESS DATE | 2000/08/31 |
| FILE TYPE | TEXT |
| CAPACITY | 200KB |
| OWNER | USER1 |

FIG. 5

| APPLICATION RANKING | ITEM | PRIORITY RULES |
|---|---|---|
| 1 | LAST ACCESS DATE | OLD : HIGH RANK |
| 2 | CREATION DATE | OLD : HIGH RANK |
| 3 | CAPACITY | LARGE : HIGH RANK |
| 4 | FILE TYPE | FILE TYPE RANKING TABLE |
| 5 | OWNER | OWNER RANKING TABLE |

61

| OWNER RANKING | OWNER |
|---|---|
| 1 | USER1 |
| 2 | USER2 |
| 3 | USER3 |
| 4 | USER4 |
| 5 | USER5 |

63

| FILE TYPE RANKING | TYPE |
|---|---|
| 1 | MOVING IMAGE |
| 2 | STILL IMAGE |
| 3 | VOICE |
| 4 | TEXT |
| 5 | OTHERS |

62

F I G. 6

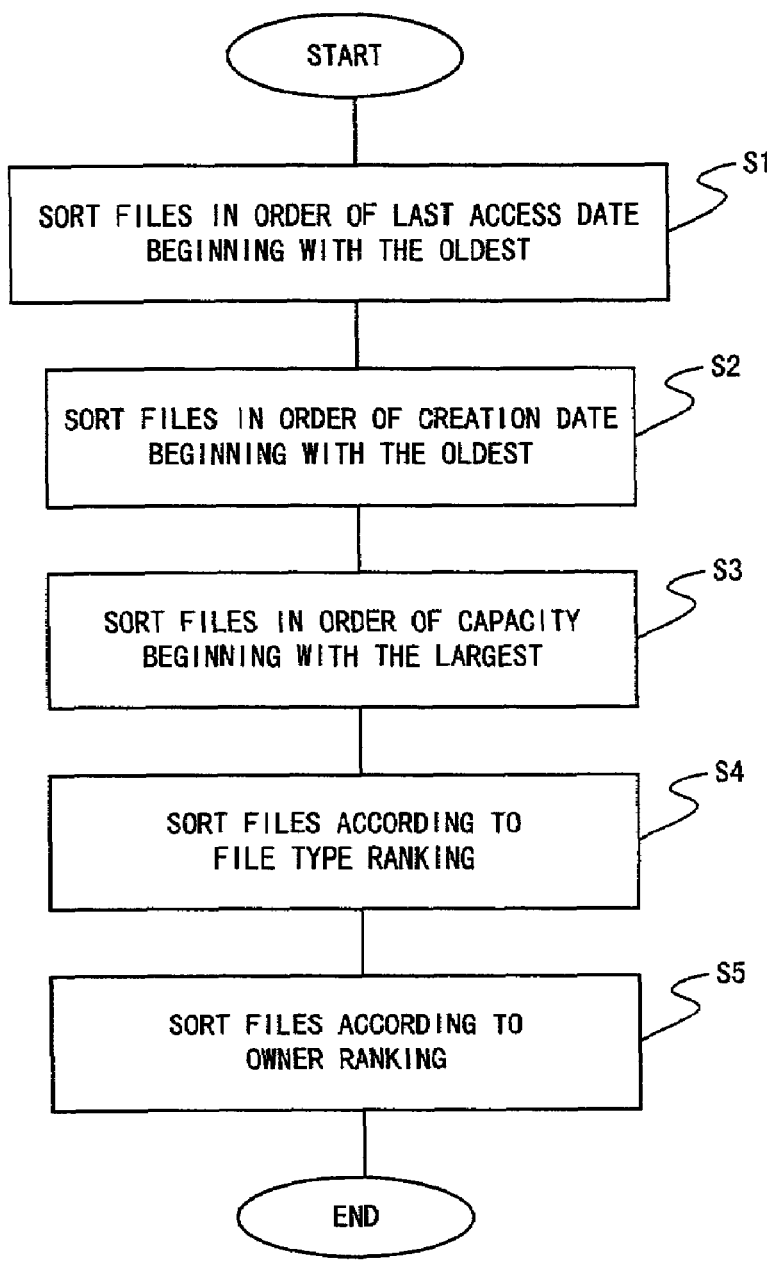
F I G. 7

| LAST ACCESS DATE | WEIGHT |
|---|---|
| MORE THAN 12MONTH AGO | 10 |
| 9-12MONTH AGO | 9 |
| 5-8MONTH AGO | 8 |
| 1-4MONTH AGO | 7 |
| WITHIN ONE MONTH | 6 |

| CREATION DATE | WEIGHT |
|---|---|
| MORE THAN 12MONTH AGO | 8 |
| 9-12MONTH AGO | 7 |
| 5-8MONTH AGO | 6 |
| 1-4MONTH AGO | 5 |
| WITHIN ONE MONTH | 4 |

| FILE TYPE | WEIGHT |
|---|---|
| MOVING IMAGE | 7 |
| STILL IMAGE | 6 |
| VOICE | 5 |
| TEXT | 4 |
| OTHERS | 3 |

| CAPACITY | WEIGHT |
|---|---|
| MORE THAN 1000KB | 6 |
| 500-750KB AND OVER | 5 |
| 250-500KB | 4 |
| 100-250KB | 3 |
| LESS THAN 100KB | 2 |

| OWNER | WEIGHT |
|---|---|
| USER1 | 5 |
| USER2 | 4 |
| USER3 | 3 |
| USER4 | 2 |
| USER5 | 1 |

FIG. 10

| REDUCTION RANKING | FILE NAME | LAST ACCESS DATE | CREATION DATE | CAPACITY | FILE TYPE | OWNER |
|---|---|---|---|---|---|---|
| 1 | File7 | 2000/06/23 | 2000/04/01 | 30KB | TEXT | USER5 |
| 2 | File3 | 2000/05/18 | 1999/10/29 | 350KB | VOICE | USER2 |
| 3 | File15 | 2000/05/18 | 1998/09/08 | 500KB | STILL IMAGE | USER1 |
| 4 | File1 | 2000/03/01 | 2000/05/29 | 90KB | TEXT | USER3 |
| 5 | File9 | 2000/02/03 | 1999/11/22 | 200KB | OTHERS | USER4 |
| 6 | File30 | 2000/02/03 | 1999/11/22 | 150KB | TEXT | USER4 |
| 7 | File18 | 2000/02/03 | 1998/04/06 | 750KB | MOVING IMAGE | USER5 |
| 8 | File22 | 2000/02/03 | 1998/01/15 | 20KB | TEXT | USER1 |
| 9 | File14 | 1999/11/30 | 2000/03/23 | 400KB | MOVING IMAGE | USER2 |
| 10 | File32 | 1999/11/30 | 2000/03/23 | 400KB | MOVING IMAGE | USER3 |

FIG. 13

| APPLICATION RANKING | PROCESSING ALGORITHM NAME | FILE TYPE |
|---|---|---|
| 1 | REVERSIBLE COMPACTION | ALL DATA |
| 2 | IRREVERSIBLE COMPACTION C1 | IMAGE |
| 3 | IRREVERSIBLE COMPACTION C2 | VOICE |
| 4 | IMAGE INFORMATION DEGENERACY (COLOR, RESOLUTION, etc.) | IMAGE |
| 5 | SUMMARIZATION | TEXT |
| 6 | SAVING | ALL DATA |
| 7 | DELETION | ALL DATA |

F I G. 1 7

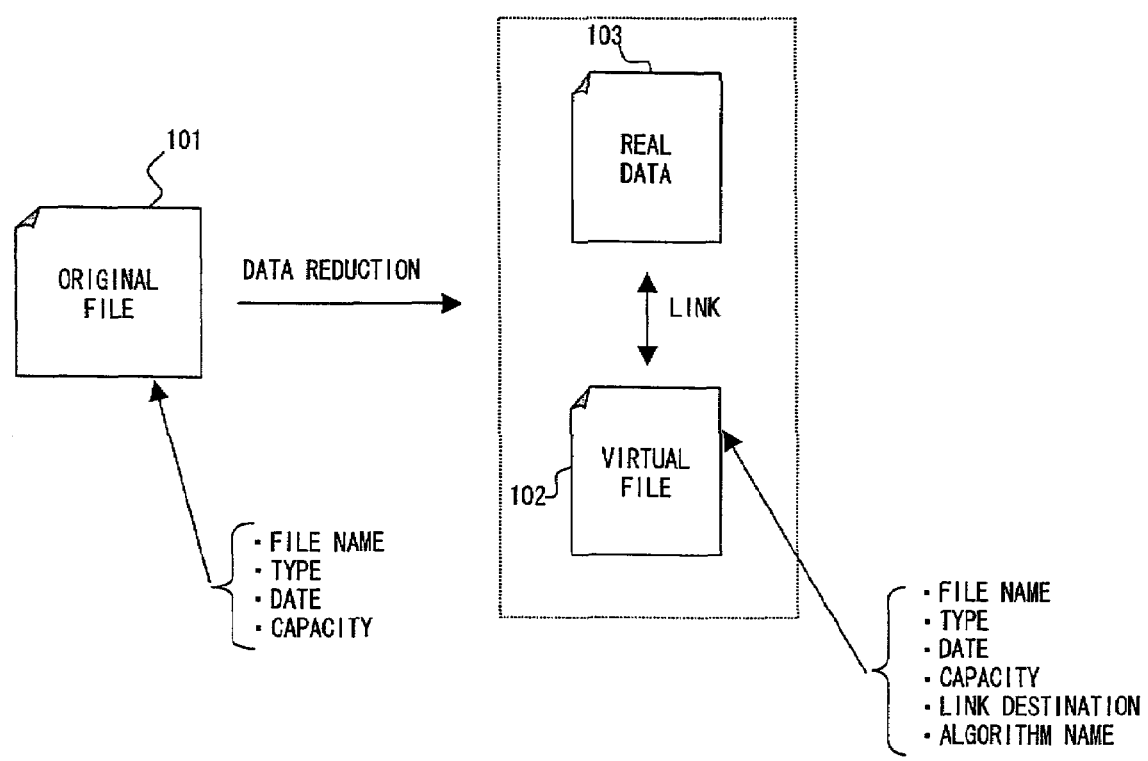
F I G. 19

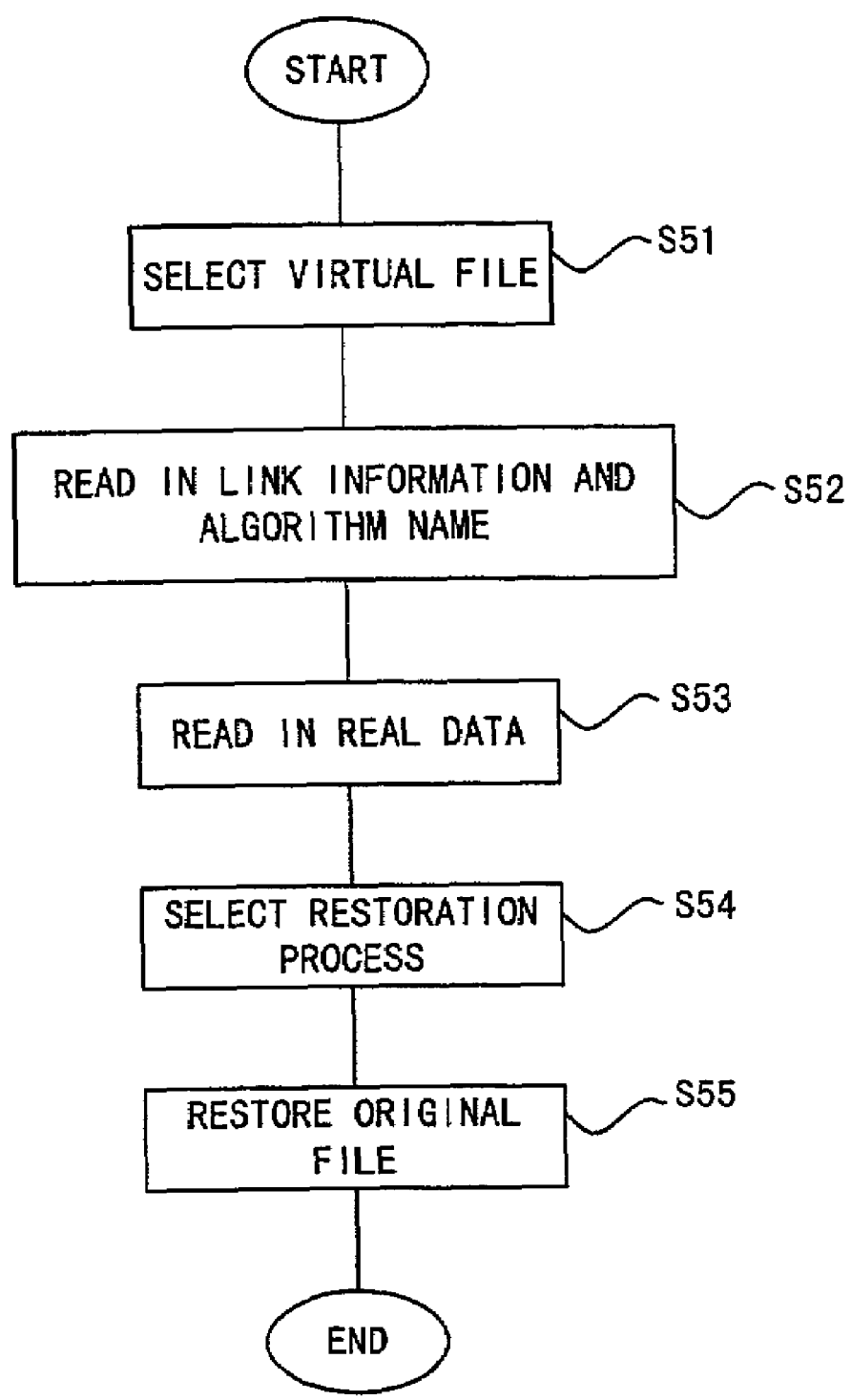
F I G. 20

| REDUCTION RANKING | FILE NAME | PROCESS P1 | PROCESS P2 | PROCESS P3 | PROCESS P4 |
|---|---|---|---|---|---|
| 1 | File7 | 29KB/s | 28KB/s | 17KB/s | 5KB/s |
| 2 | File3 | 26KB/s | 16KB/s | 13KB/s | 9KB/s |
| 3 | File15 | 19KB/s | 22KB/s | 12KB/s | 11KB/s |
| 4 | File1 | 34KB/s | 28KB/s | 19KB/s | 6KB/s |
| 5 | File9 | 22KB/s | 16KB/s | 17KB/s | 12KB/s |
| 6 | File30 | 31KB/s | 28KB/s | 21KB/s | 7KB/s |
| 7 | File18 | 25KB/s | 19KB/s | 23KB/s | 5KB/s |
| 8 | File22 | 28KB/s | 11KB/s | 10KB/s | 15KB/s |
| 9 | File14 | 24KB/s | 29KB/s | 8KB/s | 19KB/s |
| 10 | File32 | 20KB/s | 23KB/s | 14KB/s | 9KB/s |

FIG. 23

DEVICE FOR RETAINING IMPORTANT DATA ON A PREFERENTIAL BASIS

This application claims priority from Japanese Patent Application No. 2000-315084 filed Oct. 16, 2000.

BACKGROUND OF THE INVENTION

1. Field of the Invention

The present invention relates to a data storage device for recording data used in information equipment.

2. Description of the Related Art

With the recent development and spread of information equipment, there has been a rapid increase in the amount of data to be stored in a storage device in the equipment. In general, storage devices are subject to a limitation on their storage capacity. When the storage capacity is exhausted, users have to add a new storage device or medium or delete data already stored. To cope with the limited storage capacity, conventional supervisory camera systems adopt a method which involves automatically deleting old image data and then writing new image data.

FIG. 1 illustrates a method to delete files in conventional information equipment. The information equipment 11 is composed of a CPU (Central Processing Unit) 12, a memory 13, an input/output device 14, and a storage device 15, which are all interconnected by a bus 16. When a new file 17 is added to the storage device 15, an old file is deleted automatically and the file 17 is then written into the vacated memory area.

However, with information equipment, such as a personal computer (PC), old data is not always garbage. Deleting a file in the same way as above may result in loss of important data. Therefore, the demand has increased for reserving free storage space automatically taking into account the significance of data.

BRIEF SUMMARY OF THE INVENTION

It is an object of the present invention to provide a data storage device which allows important data to be retained on a preferential basis and the limitation on storage capacity to be concealed.

A data storage device of the present invention comprises a data storage unit, a rule setup unit, an assignment unit, and a reduction unit.

The data storage unit stores a plurality of files each having a plurality of attributes. The rule setup unit stores a ranking rule for ranking the files for each of their attributes. The assignment unit assigns reduction ranking to each of the files on the basis of the ranking rules associated with the attributes. The reduction unit reduces data in each file according to the reduction ranking when the storage capacity of the data storage unit is insufficient for new data storage.

BRIEF DESCRIPTION OF THE SEVERAL VIEWS OF THE DRAWING

FIG. 2A is a diagram for use in explanation of the principles of a data storage device of the present invention;

FIG. 4 shows recording media;

FIG. 5 shows file attributes;

FIG. 6 shows information in the rule setup section;

FIG. 7 is a flowchart of the first ranking determination processing;

FIG. 10 shows weight tables;

FIG. 13 shows a file reduction ranking table;

FIG. 17 shows a table of the ranking of processing algorithms;

FIG. 19 shows a virtual file and real data;

FIG. 20 is a flowchart of the restoration processing;

FIG. 23 shows a reduction speed table; and

DETAILED DESCRIPTION OF THE INVENTION

Figure 1:
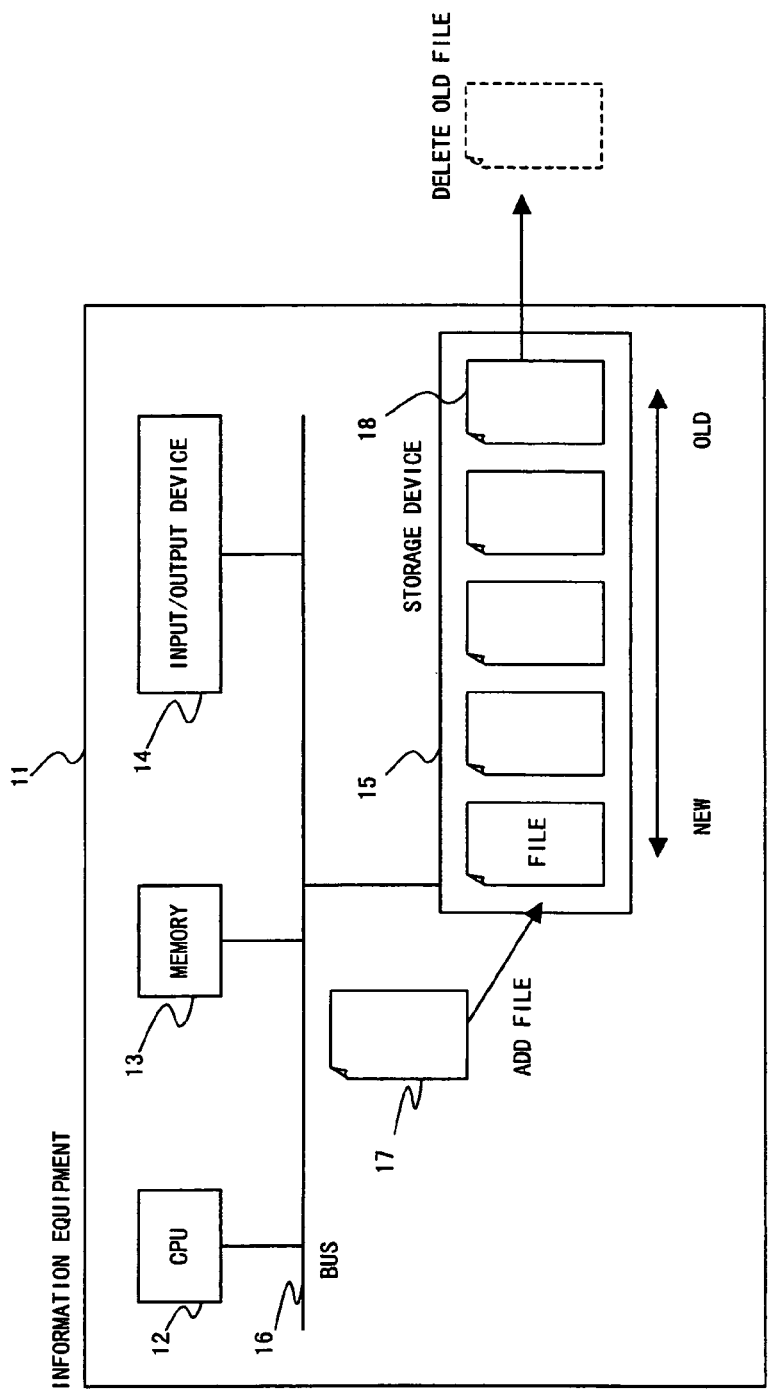
FIG. 1 is a diagram for use in explanation of a conventional method to delete a file.

First, the principles of a data storage device of the present invention will be described with reference to FIG. 2A. The data storage device comprises a data storage unit 21, a rule setup unit 22, an assignment unit 23, and a reduction unit 24. The data storage unit 21 stores a plurality of files. The rule setup unit 22 stores a ranking rule for ranking the files for each of their attributes. The assignment unit 23 assigns reduction ranking to each of the files on the basis of the ranking rules associated with the attributes. The reduction unit 24 reduces data in the files according to reduction ranking when the storage capacity of the data storage unit 21 becomes insufficient.

To each file stored in the data storage unit are attached attributes, such as date, type, capacity (size), etc. The rule setup unit 22 stores a predetermined ordering rule associated with each attribute. The assignment unit 23 determines the reduction ranking with reference to the ranking rules in the rule setup unit 22.

When the storage capacity is found to be insufficient on the occurrence of a request for writing into the data storage unit 21, the delete unit 24 selects files to be processed according to the reduction ranking and then automatically reduces data in the selected files. The methods for reducing data include file deletion, data compaction, document summarization, and file saving.

According to such a data storage device, a file of higher importance can be ranked lower in the reduction ranking, allowing the files to be subjected to data reduction in sequence beginning with the least important file. Therefore, important data can be retained on a preferential basis and the limitation on storage capacity can be hidden.

The data storage unit 21, the rule setup unit 22, the assignment unit 23 and the reduction unit 24 in FIG. 2A correspond to a storage section 42, a rule setup section 46, a priority processing section 44, and a data reduction section 45, respectively, in FIG. 3, which will be described later.

The present embodiment determines the importance of each file according to predetermined rules based on file attributes in the storage device and reduces data in the files in the order of their importance beginning with a file of the least importance. Thereby, the retention of important data and the removal of limitation on storage capacity can be made compatible with each other.

Figure 2B:
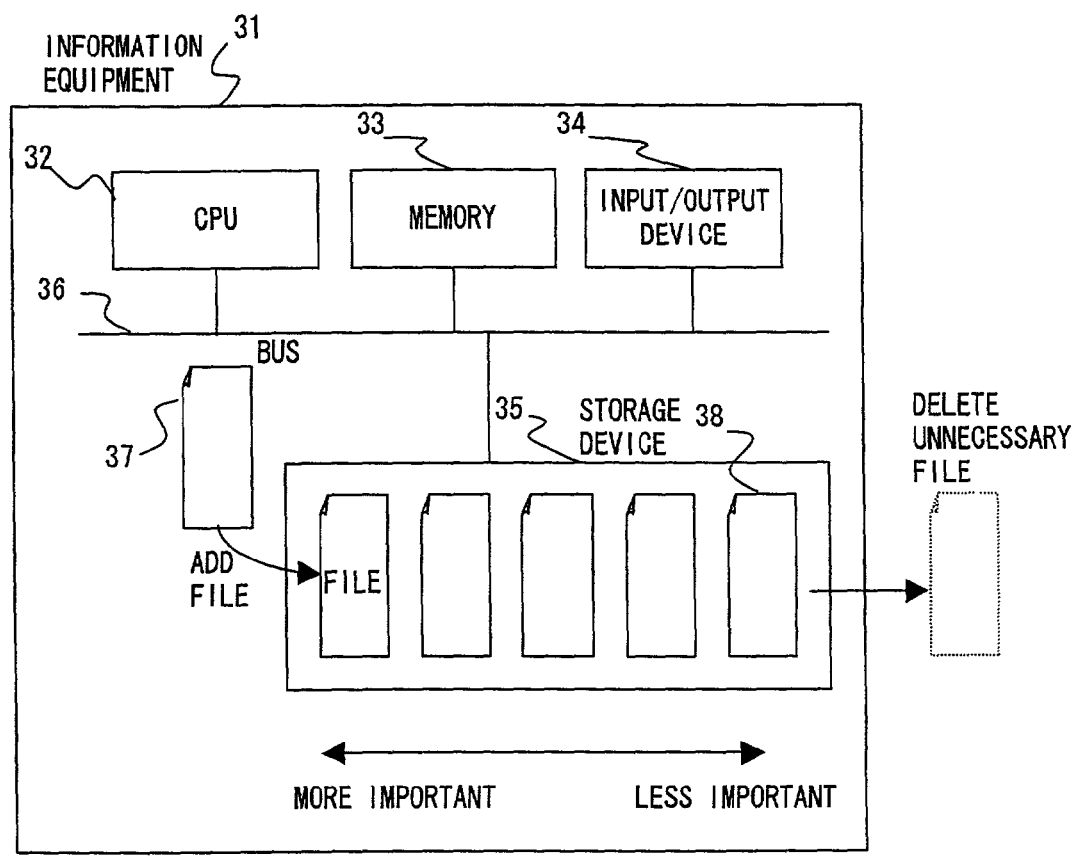
FIG. 2B is a diagram for use in explanation of a method to delete files in accordance with the present invention.

FIG. 2B shows such a file reduction method. Information equipment 31 of FIG. 2B comprises a CPU 32, a memory 33, an input/output device 34, and a storage device 35, which are interconnected by a bus 36. This information equipment corresponds to any type of computer-based equipment.

The memory 33 comprises a ROM (read only memory), a RAM (random access memory), etc., and stores programs and data used in data processing. The CPU 32 executes the programs using the memory 33 to perform required processes. The input/output device 34 comprises a keyboard, a pointing device, a touch panel, a display, a printer, a speaker, etc., and is used for entry of commands and information from a user and outputting inquiries to the user and the results of processing.

The storage device 35 is a magnetic disk drive, an optical disk drive, a magneto-optical disk drive, or a tape drive. The files in the storage device are ranked in ascending order of importance beginning with the least important file. When the storage capacity is running short with the addition of a new file 37, the files are automatically deleted in sequence beginning with a file 38 (unnecessary file) high in rank to reserve a storage space required for writing in the new file 37.

Figure 3:
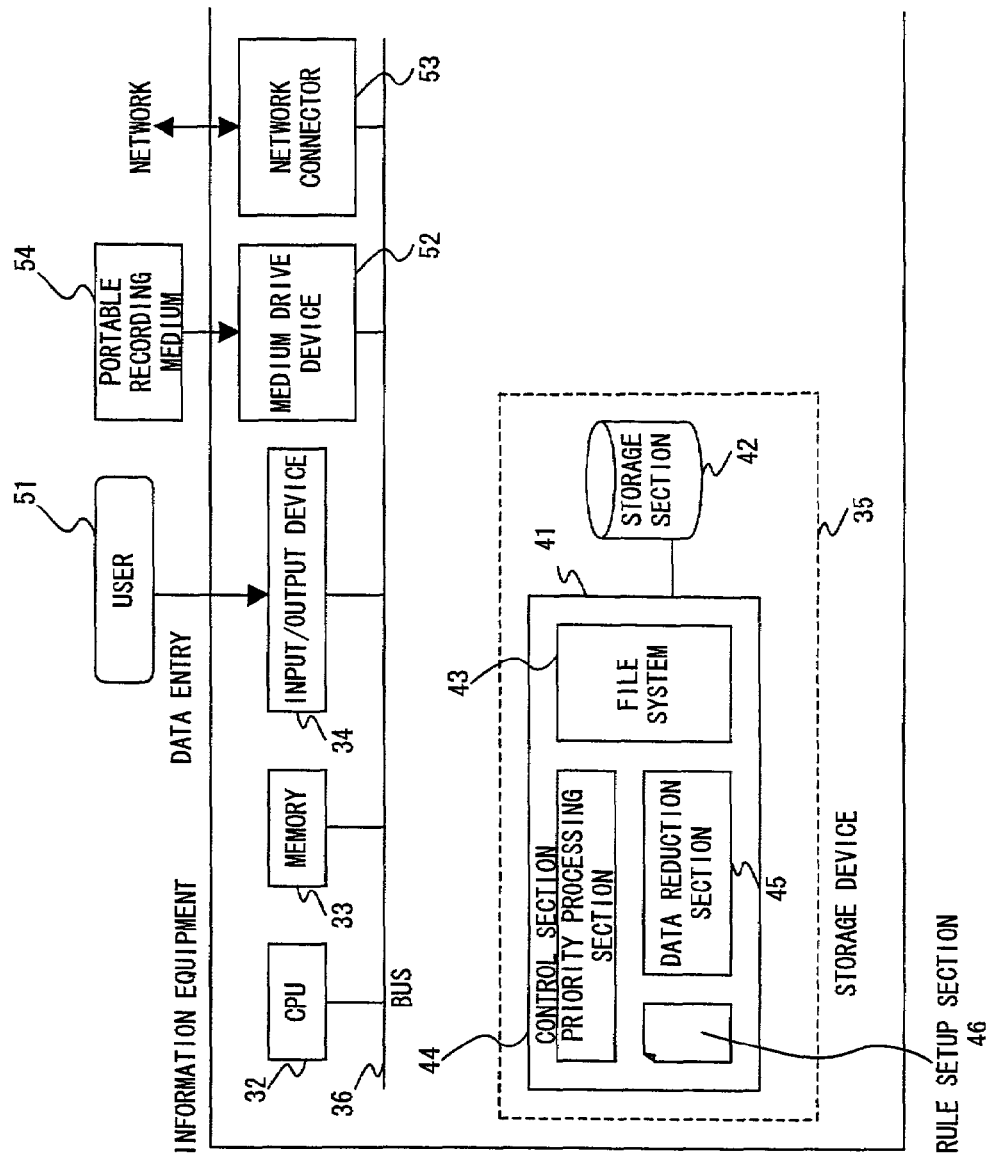
FIG. 3 shows the arrangement of information equipment.

FIG. 3 shows the more detailed internal arrangement of the information equipment 31 of FIG. 2B. The storage device 35 comprises a control section 41 and a storage section 42. The control section 41 includes a file system 43, a priority processing section 44, a data reduction section 45, and a rule setup section 46. The file system 43, the priority processing section 44 and the data reduction section 45 correspond to program-described software that is executed by a processing unit (not shown) provided in the control section 41.

The file system 43 manages files stored in the storage section 42. The rule setup section 46 is stored with data on rules for priority. The priority processing section 44 determines the importance of the files in the storage section 42 according to the priority rules. The data reduction section 45 deletes files in sequence beginning with the least important file when the storage capacity is insufficient for data entry from the user 51.

To the bus 36 are further connected a medium drive device 52 and a network connector 53. The medium drive device 52 drives a portable recording medium 54 for access to its recorded contents. The portable recording medium may be any type of computer-readable recording medium, such as a memory card, a floppy disk, a CD-ROM (compact disk read only memory), an optical disk, a magneto-optical disk, or the like. The user 51 prestores programs and data on the portable recording medium and loads them into the memory 33 and the control section 41 when necessary.

The network connector 53 is connected to a communications network such as a local area network (LAN) and provides data conversion for communications. The information equipment 31 receives programs and data via the network connector 53 from another device, such as a server, and loads them into the memory 33 and the control section 41 when necessary.

FIG. 4 shows computer-readable recording media that supplies programs and data to the information equipment 31 of FIG. 3. The programs and data stored on the portable recording medium 54 or in a database 56 of a server 55 are loaded into the information equipment 31. In this case, the server 55 produces a propagation signal to propagate the programs and data and transmits it through an arbitrary transmission medium over a network to the information equipment 31, which in turn executes the programs using the data.

The file reduction processing by the information equipment 31 of FIG. 3 will be described in greater detail below with reference to FIGS. 5 through 24.

First, to determine the importance of files, use is made of a plurality of file attributes as shown in FIG. 5 by way of example. The file attributes of FIG. 5 comprise file name, creation date, last access date, file type, capacity (size), and owner. These attributes are set up for each file. The creation date is the date on which the corresponding file was created. The last access date is the date on which the last access was made to the corresponding file. The file type is the sort of data the file contains (such as text, moving image, still image, voice, etc.). The owner is identification information for the user to whom that file belongs.

In the rule setup section 46, application ranking and rules for determining priority as shown in FIG. 6 by way of example are set up on the file attributes. The information of FIG. 6 comprises an application ranking table 61, a type ranking table 62, and an owner ranking table 63. The application ranking table 61 represents the order in which the attributes are applied in determining the importance of each file. Here, the attributes are ranked in the order of last access date, creation date, capacity, file type, and owner.

The priority rules represent ranking rules for determining the reduction ranking for the files. The higher a file ranks, the more preferentially it is deleted. Here, for the last access date and creation date, a rule is set up such that the older a file is, the higher it ranks. For the capacity, a rule is set up such that the larger a file is, the higher it ranks. For each of the file type and owner, a rule is set up such that the ranking of the files is determined according to the type ranking table 62 or the owner ranking table 63 and pointer information pointing to each of these tables is stored.

The type ranking table 62 defines the ranking of the file types. Here, the file types are ranked in the order of moving image, still image, voice, text, etc. The owner ranking table 63 represents the ranking of owners. Here, the owners are ranked in the order of user 1, user 2, user 3, user 4, and user 5.

FIG. 7 is a flowchart of the ranking determination processing using such priority rules. The priority processing section 44 uses a priority rule for each attribute in the rank order of the attributes set up in the attribute ranking table to sort the files in the storage section 42 into the ascending order of importance and thereby determines the reduction ranking.

The priority processing section 44 first sorts files to be processed in the order of last access date beginning with the oldest (step S1) and then sorts the files of the same last access date in the order of creation date beginning with the oldest (step S2).

The priority processing section 44 next sorts the files of the same creation date in the decreasing order of capacity beginning with the largest (step S3) and then sorts the files of the same capacity according to the ranking of file types (step S4). Finally, the priority processing section sorts the files of the same file type according to the ranking of owners (step S5). Thus, the procedure comes to an end.

Figure 8:
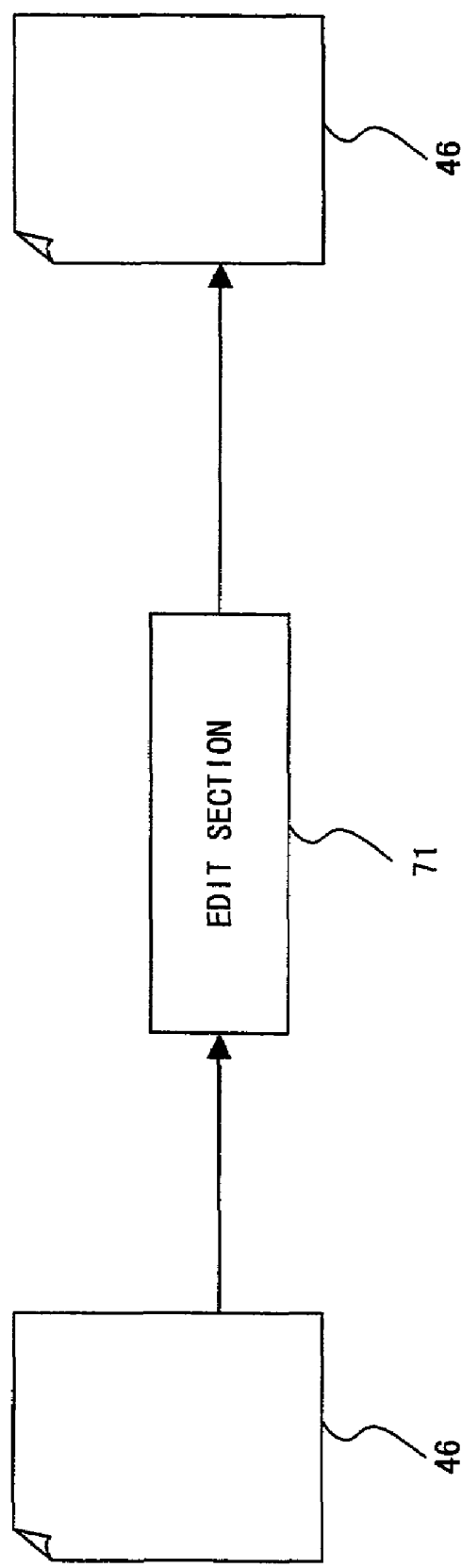
FIG. 8 shows an editing processing.

It should be noted that the file attributes shown in FIG. 5 and the rules for priority shown in FIG. 6 are merely exemplary and other file attributes and priority rules can also be set up. For example, by providing an edit section 71 in the information equipment 31 as shown in FIG. 8, information in the rule setup section 46 can be edited (altered). The edit section 71 is implemented by a program, allowing the user to edit information in the rule setup section 46 and set up his or her own rules for priority.

Figure 9:
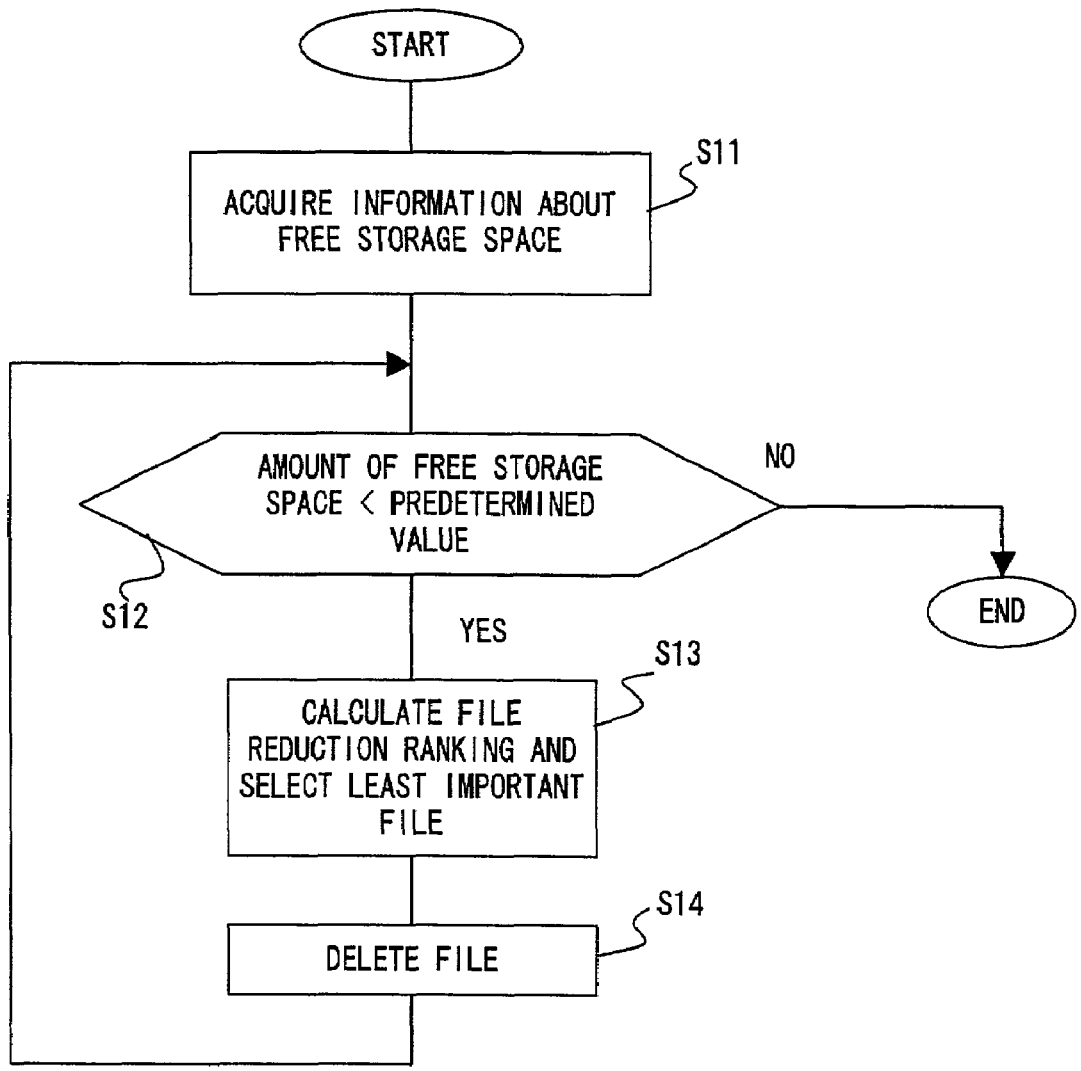
FIG. 9 is a flowchart of the first reduction processing.

FIG. 9 is a flowchart of the reduction processing by the data reduction section 45 when the storage capacity is found to be insufficient on the occurrence of a request for writing in a new file. The data reduction section 45 first acquires information about free storage space in the storage section 42 (step S11) and then makes a comparison between the amount of free storage space and a predetermined value (step S12). The default value may be the size of a file to be written in.

When the amount of free space is less than the default value, a request is made to the priority processing section 44 for determining the reduction ranking of the files (step S13). In response to this, the priority processing section 44 calculates the reduction ranking of the files according to the procedure of FIG. 7, then selects the least important file and notifies the data reduction section 45 of it. The data reduction section 45 deletes the corresponding file (step S14). The procedure then returns to step S12. The procedure is repeated until the decision in step S12 indicates that the amount of free space has reached the predetermined value in step S12.

It will also be possible to determine the reduction ranking of the files by weighting each file attribute according to its importance in advance. FIG. 10 shows examples of weight tables that hold such weighting information. The weight tables hold weights for values of the respective attributes shown in FIG. 5 and are stored in the rule setup section 46.

For attributes that can take consecutive values like the last access date, creation date and capacity, their range of values is divided into a plurality of intervals and a weight is set up on each of the intervals. For the other attributes that take discrete values like the file type and owner, a weight is set up on each value. The importance of a file decreases as the weight for its attribute value increases.

Figure 11:
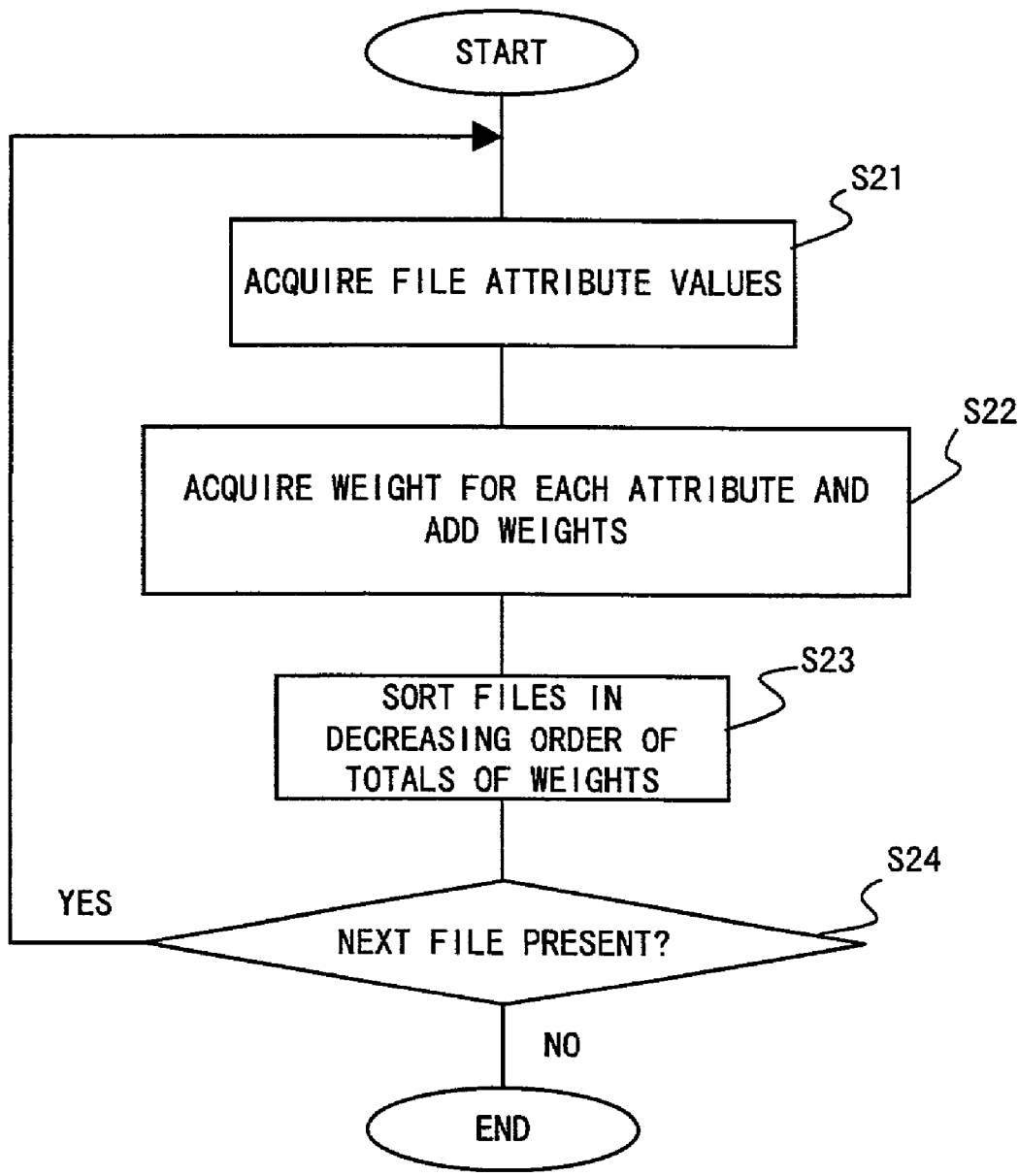
FIG. 11 is a flowchart of the second ranking determination processing.

FIG. 11 is a flowchart of the ranking determination processing using such weight tables. The priority processing section 44 calculates the total of weights for the attributes of each file on the basis of weight information in the weight tables and then determines the reduction ranking accordingly.

The priority processing section 44 first selects one file to acquire attribute values of that file (step S21) and then acquires a weight for each attribute value from the weight tables to calculate the total of the weights (step S22). After that, the files for which the weights have already been totalized are sorted in the decreasing order of totals (step S23) and a decision is then made of the presence or absence of the next file unprocessed (step S24).

In the presence of the unprocessed file, the procedure is repeated beginning with step S21. After all the files have been sorted, the procedure comes to an end. Thus, by repeating the procedure for each of the files in the storage section 42, the files can be ranked in order of increasing importance.

With the reduction processing as shown in FIG. 9, the reduction processing takes precedence over the data write processing; thus, the overall processing time will increase. Next, a description is given of a method of speeding up the processing.

Figure 12:
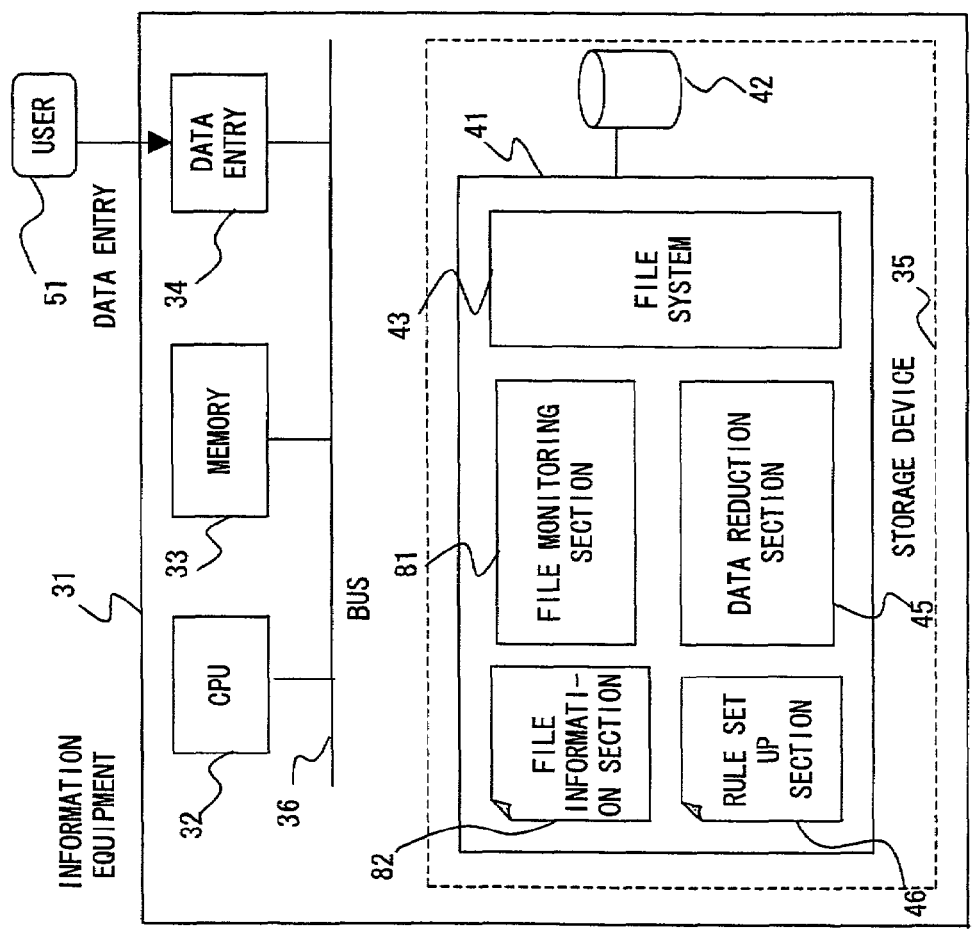
FIG. 12 shows a file monitoring section.

FIG. 12 shows the arrangement of information equipment provided with a file monitoring section to speed up the reduction processing. In this information equipment, a file monitoring section 81 is provided instead of the priority processing section 44 of FIG. 3.

The file monitoring section 81, which is implemented by a resident program by way of example, monitors the attributes of the respective files all the time. The file monitoring section 81 performs the ranking determination processing of FIG. 7 or 8 according to the priority rules in the rule setup section 46 during the idle time in the processing of reading from/writing into the storage section 42 and then stores the results into a file information section 82.

For example, such a file reduction ranking table as shown in FIG. 13 is created by sorting the files according to the ranking determination processing of FIG. 7. This table holds the attributes of the respective files in the descending order of reduction ranking and is stored in the file information section 82.

Figure 14:
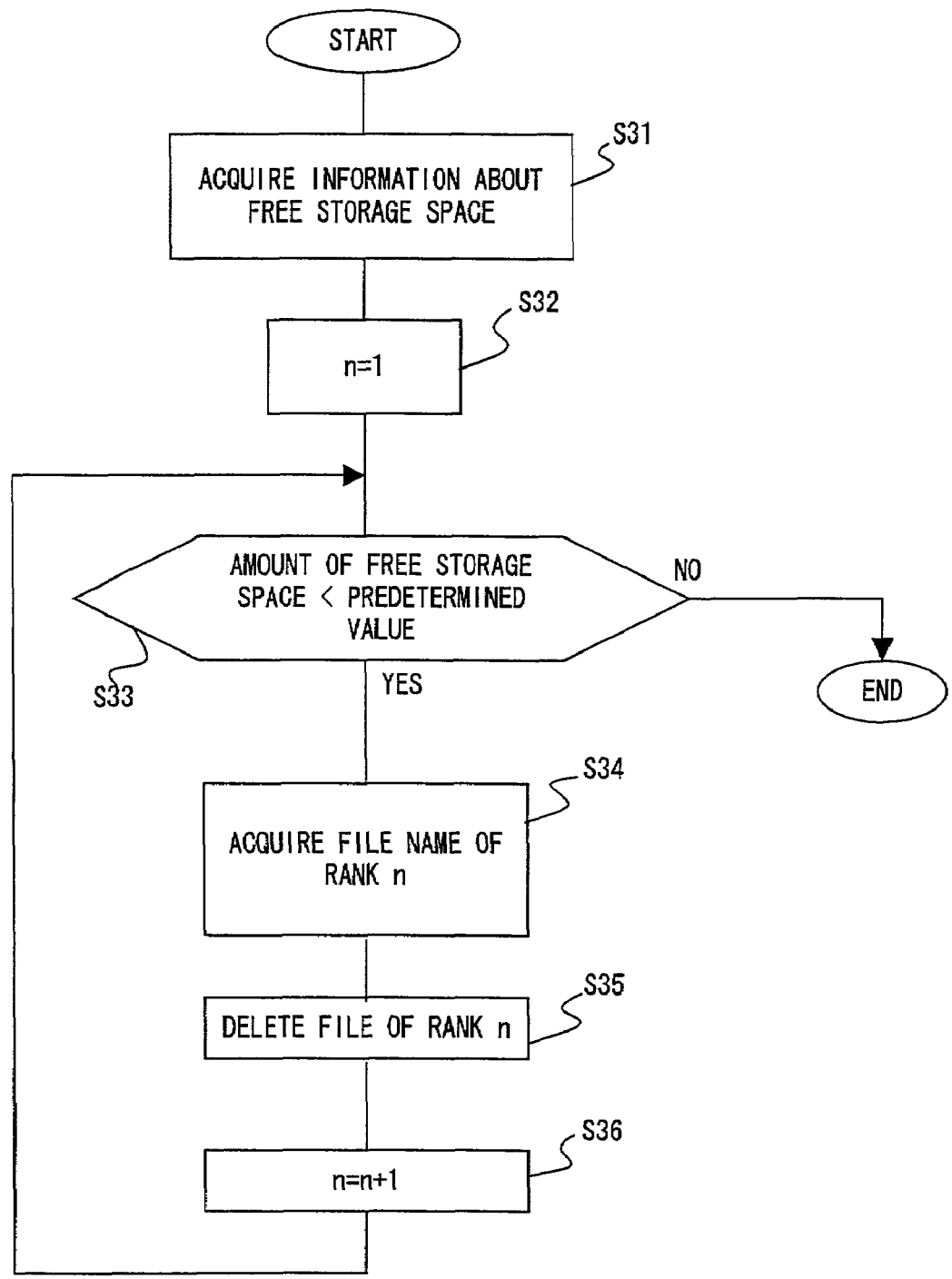
FIG. 14 is a flowchart of the second reduction processing.

FIG. 14 is a flowchart for the reduction processing using such a file reduction ranking table. The data reduction section 45 first acquires information about the amount of free storage space in the storage section 42 (step S31), then initializes a counter n representing the reduction ranking to one (step S32) and makes a comparison between the amount of free storage space and a predetermined value (step S33).

When the amount of free storage space is less than the default value, the data delete section refers to the file reduction ranking table to obtain a file name corresponding to the reduction rank n (step s34) and then deletes the file having that name (step S35). Next, n is incremented by one (step S36) and the procedure is then repeated beginning with step S33 until the amount of free storage space reaches the predetermined value.

According to such reduction processing, since reference is simply made to the previously created file reduction ranking table, there is no need to calculate the reduction ranking for each file as in the processing of FIG. 9. The reduction processing can therefore be speeded up.

Figure 15:
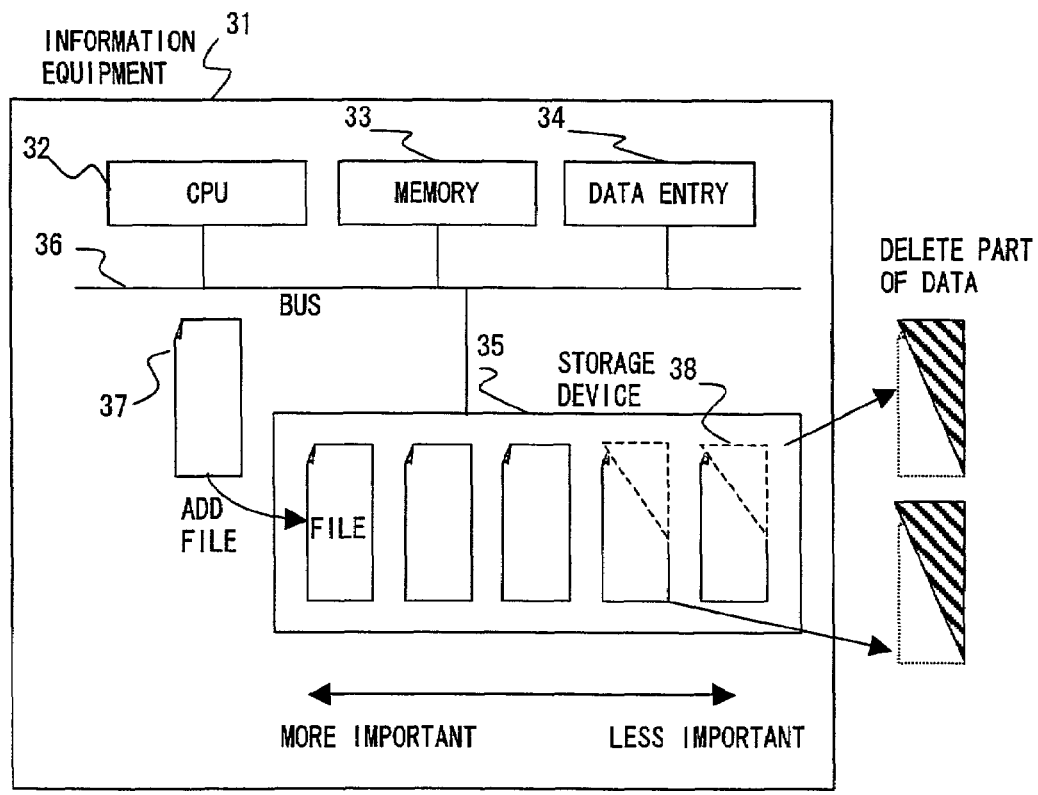
FIG. 15 is a diagram for use in explanation of a method to delete partly a file.

To reserve storage space, it will also be possible to delete only a portion of data in a file as opposed to deleting all the data. FIG. 15 shows a method to delete a file partly. In this case, when the storage capacity becomes insufficient with the addition of a new file 37, a portion of data in each unnecessary file 38 is deleted in sequence, thereby reserving storage space required for writing in.

Figure 16:
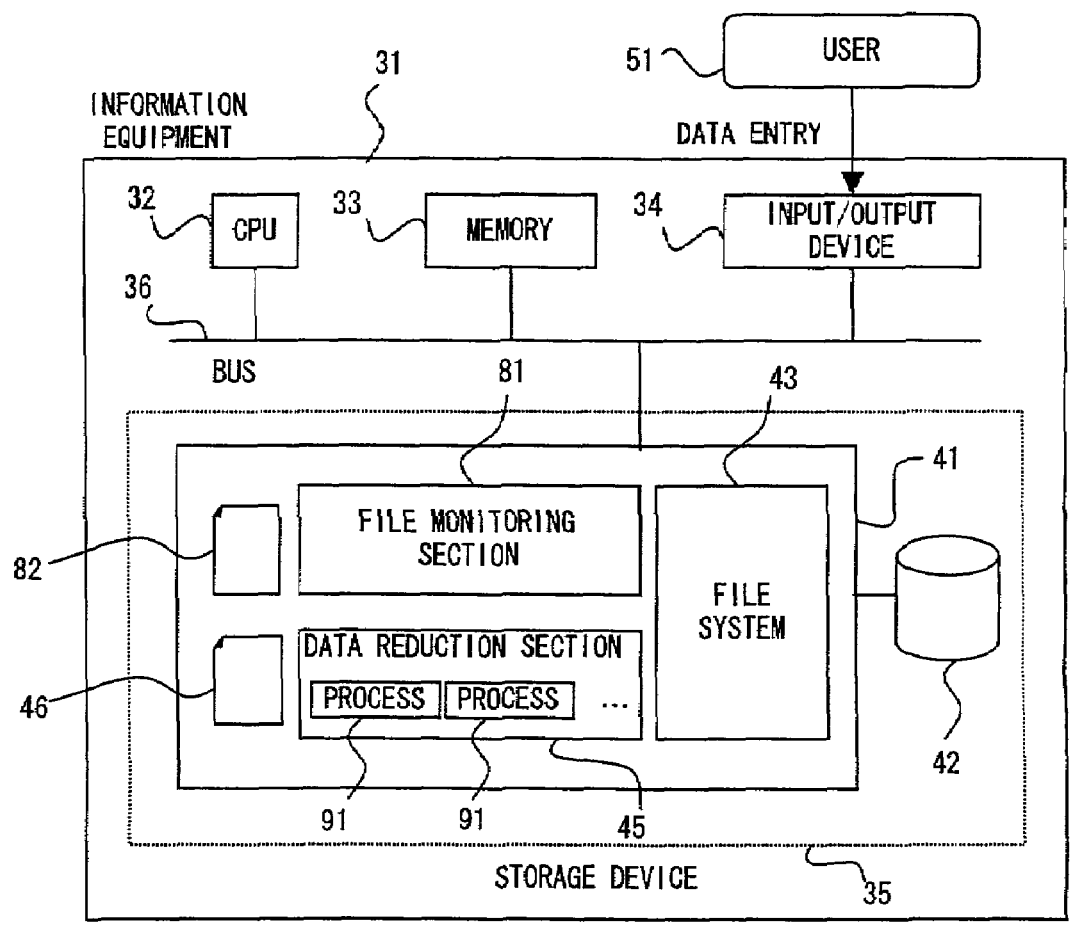
FIG. 16 shows a plurality of reduction processes.

FIG. 16 shows the arrangement of information equipment having a plurality of reduction processes for such part file reduction processing. In the information equipment 31 of FIG. 16, the data reduction section 45 holds a plurality of reduction processes 91 each of which is based on a respective one of separate processing algorithms. The processing algorithms include data compaction, document summarization, file saving, file deletion, etc. The reduction processes 91 are each installed in the form of a program-described software component.

The data compaction is subdivided into reversible compaction, irreversible compaction, image information degeneracy (color degeneracy, resolution reduction, etc.), etc., each of which is installed as a separate reduction process. The algorithm for document summarization may be any one. For example, according to a method for document summarization disclosed in Unexamined Japanese Patent Publication No. 10-207891, a summary is created by extracting from a document parts relevant to information to which the document creator calls user's attention and information to which the user pays attention.

The file saving is a process of transferring a file to a separate storage device in the information equipment 31, a storage device on a network, the portable recording medium 54, etc. The file deletion is a process of deleting all the data in a file.

The data reduction section 45 selects suitable files for each of the reduction processes 91 to perform as little data reduction as possible so that the contents of files are retained as much as possible. In this case, the file information section 82 is provided with a data reduction ranking table in a form similar to the file reduction ranking table shown in FIG. 13 and a processing algorithm ranking table.

FIG. 17 shows an example of a processing algorithm ranking table. In this table are set up the ranks assigned to the reduction processes 91, the algorithm names (identification information for the processes) and the types of files to be processed. The file type labeled "ALL DATA" indicates that the corresponding algorithm can be applied to all types of files. The irreversible compaction names C1 and C2 correspond to compaction algorithms for image data and voice data, respectively.

Figure 18:
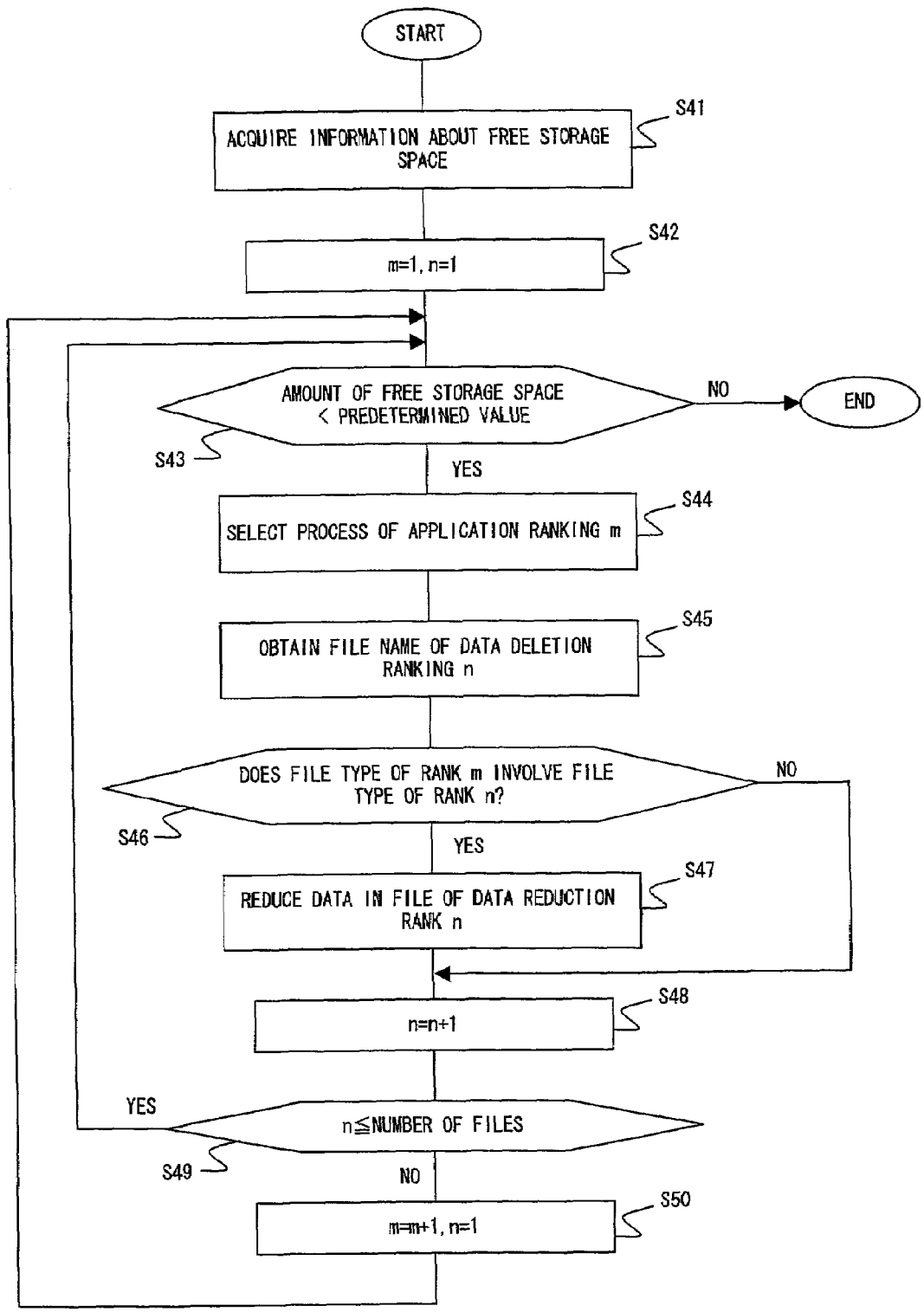
FIG. 18 is a flowchart of the third reduction processing.

FIG. 18 is a flowchart for the reduction processing using such a processing algorithm ranking table. The data reduction section 45 determines a combination of a reduction process and a file subjected to data reduction on the basis of the application ranking of the reduction processes entered into the processing algorithm ranking table and the reduction ranking of files entered into the data reduction ranking table.

The data reduction section 45 first acquires information about free storage space in the storage section 42 (step S41), then initializes both of a counter m representing the application ranking of a reduction process and a counter n representing the reduction ranking of data to one (step S42) and makes a comparison between the amount of free storage space and a predetermined value (step 43).

If the amount of free storage space is less than the predetermined value, the data reduction section 45 refers to the processing algorithm ranking table to select a reduction process corresponding to the rank m (step S44) and then refers to the data reduction ranking table to obtain a file name corresponding to n (step S45). A check is then made as to whether or not the file type associated with the selected reduction process involves the type of the file of the rank n (step S46).

If the file type associated with the selected reduction process involves the type of the file of the rank n, then data in that file is reduced using the reduction process (step S47). Next, n is incremented by one (step S48) and a comparison is then made between n and the number of files entered into the data reduction ranking table (step S49). If n is not more than the number of files, the procedure returns to step S43.

If, in step S47, the file type associated with the selected reduction process does not involve the file type of the file of the rank n, then the procedure goes to step S48. Thereby, the next file is selected as a target of processing.

If, in step S49, n is greater than the number of files, then m is incremented by one with n=1 (step S50) and the procedure returns to step S43. If the decision in step S43 is that the amount of free storage capacity is not less than the predetermined value, then the procedure comes to an end.

According to such reduction processing, the previously created data reduction ranking table can be referenced to speed up the processing as in the reduction processing in FIG. 14. Even with a file of low importance, a portion of its data can be left and referred to at a later time. Particularly, in the case of data reduction using reversible compaction or file saving, an original file can be restored, as required, by data restoration processing.

A file that can be restored is retained in such a form as shown in FIG. 19. As shown, when an original file 101 is subjected to data reduction, data relating to the file with reduced data is retained with separation into a virtual file 102 and real data 103.

The virtual file 102 holds file information of the file after processing and is stored into the storage section 42. The file information contains the information of the original file 101, such as file name, type, date (creation date, last access date), and capacity, link information (pointer) that points to the real data 103, and the processing algorithm name associated with the reduction process.

The file data after processing is not contained in the virtual file 102 but is retained in the real data 103. For example, in the case of reversible compaction, the real data 103 corresponds to compacted data and is stored in the storage section 42. In the case of file saving, the real data 103 corresponds to data in the original file 101 and is retained on a medium used for saving.

FIG. 20 is a flowchart for the restoration processing carried out when a file thus retained is called by the user. When the user selects a virtual file (step S51), the file system 43 first reads in the link information and the processing algorithm name from the file information for the selected virtual file (step S52).

The file system next reads in the real data pointed to by the link information (step S53) and selects a restoration processing algorithm corresponding to the processing algorithm name (step S54). Finally, the file system 43 restores the original file and presents it to the user (step S55).

Figure 21:
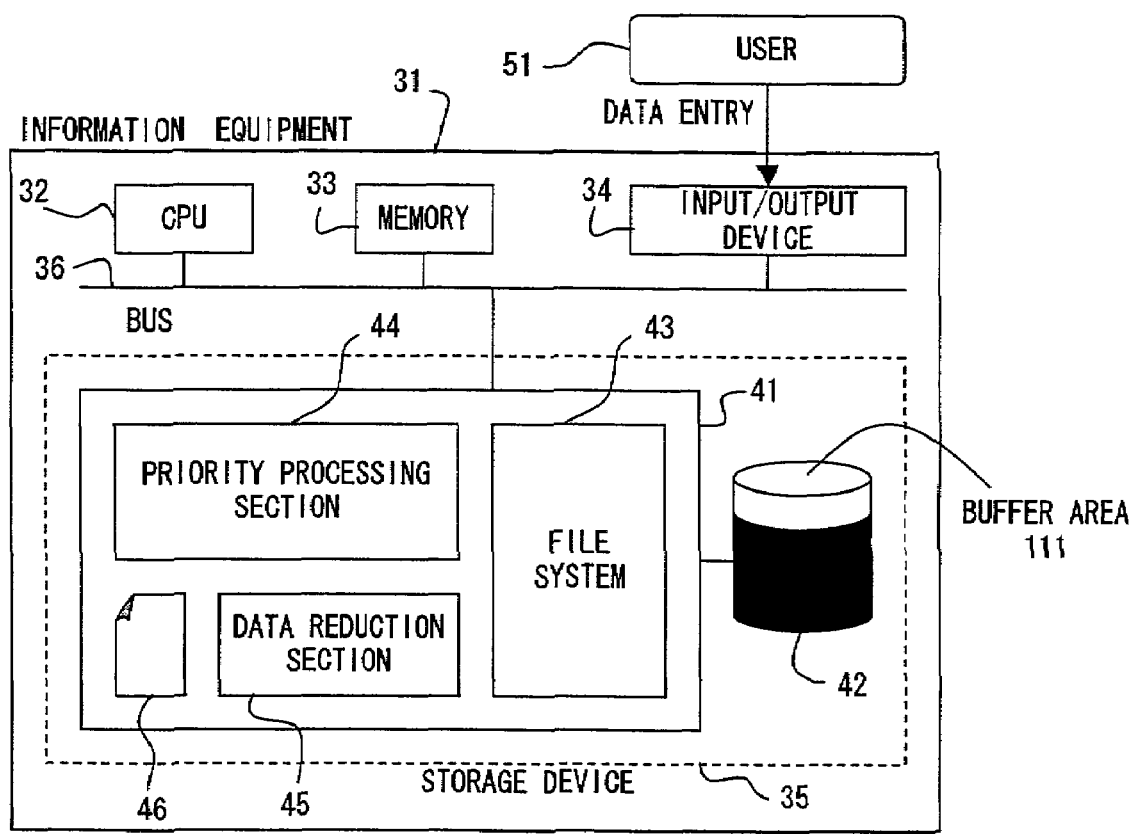
FIG. 21 shows a buffer area.

FIG. 21 shows the arrangement of information equipment which is provided with a buffer area to speed up the data write processing. In this equipment, a fixed free area 111 has been reserved beforehand as a buffer in the storage section 42 and is used for temporarily writing in data when the storage capacity is running short. The capacity of the buffer area 111 is excluded from the storage capacity of the storage section 42.

Figure 22:
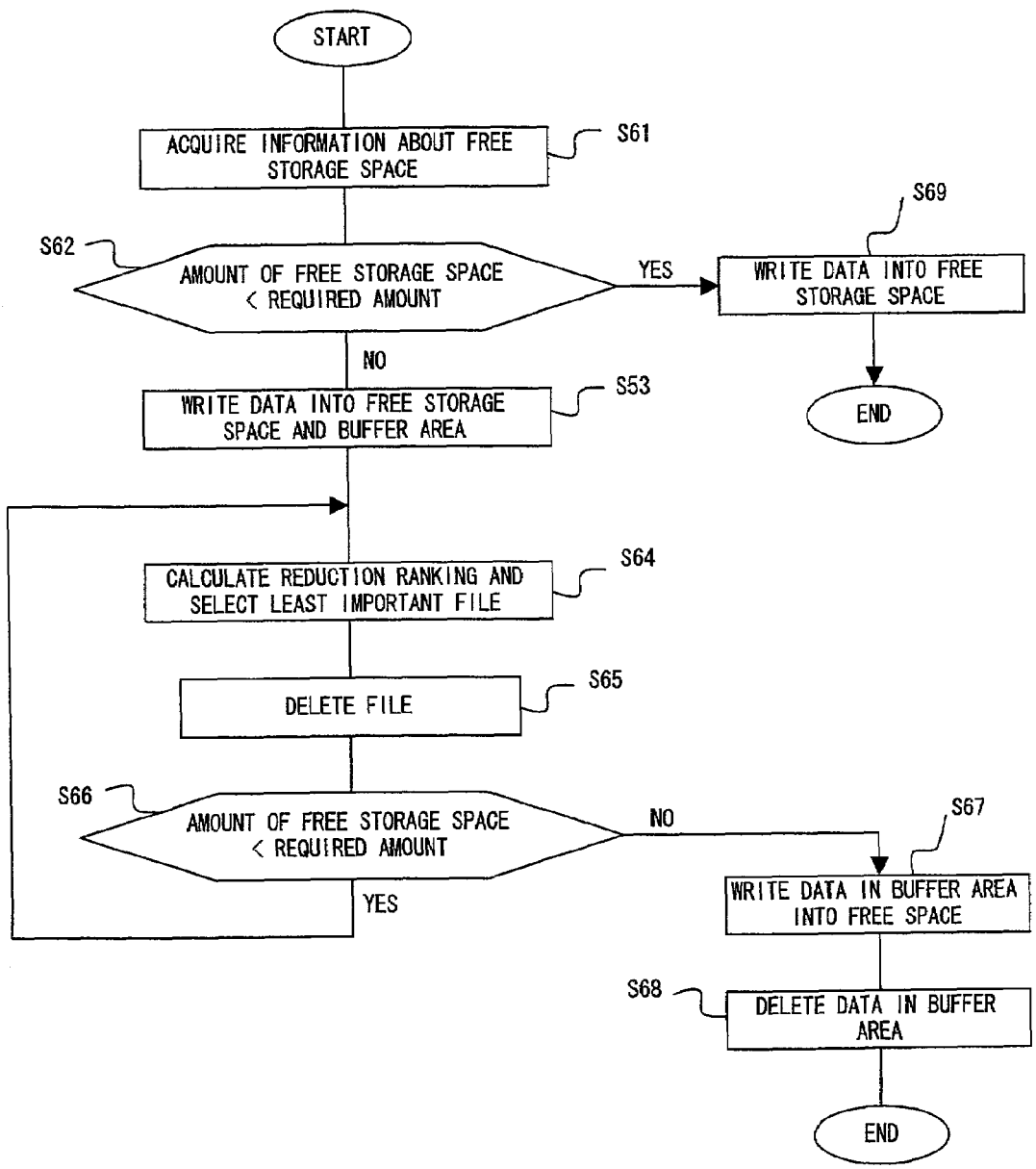
FIG. 22 is a flowchart of the fourth reduction processing.

FIG. 22 is a flowchart for the reduction processing using such a buffer area. After data has been written into the buffer area, the reduction ranking of the files is determined.

The data reduction section 45 first acquires information about free storage space in the storage section 42 (step S61) and then makes a comparison between the amount of free storage space and a required amount of storage (step S62). As the required amount of storage use is made of the capacity (size) of a file to be written in by way of example.

If the amount of free storage space is less than the required amount, then data is first written into the free storage space of the storage section 42, and then the remaining data is written into the buffer area 111 (step S63). Next, as in step S13 in FIG. 9, a request is made to the priority processing section 44 for determining the ranking and information of a file of the least important is then received (step S64).

That file is then deleted (step S65). A comparison is made again between the amount of free storage space and the required amount (step S66). The amount of free storage space in this case corresponds to the total amount of deleted data and the required amount corresponds to the amount of data stored in the buffer area 111.

If the amount of free storage space is less than the required amount, then the procedure returns to step S64. If the amount of free storage space is equal to or more than the required amount, then the data in the buffer area 111 is written into the free storage space (step S67) and then the data in the buffer area 111 is deleted (step S68). Thus, the procedure is terminated. If, on the other hand, the amount of free storage space is more than the required amount from the beginning in step S62, then all the data is written into the free storage space (step S69) and the procedure is terminated.

According to such reduction processing, when the free storage space is insufficient, part of data is written into the free storage space, then the remaining data is written into the buffer area 111 and the reduction processing is performed. Therefore, the data writing is not deferred until the termination of the reduction processing, allowing the overall processing time to be reduced.

Next, a description is given of a method to speed up the processing by specifying the time required for the data reduction processing. First, the waiting time for the start of writing is set. The waiting time may be set as a system default value or may be set arbitrarily by the user. The data reduction section 45 completes the reduction processing during the waiting time. In this case, the control section 41 in the storage section 35, at the time of idling, sets up a reduction speed table in which the reduction speed is recorded for each file and stores it into the file information section 82.

FIG. 23 shows an example of such a reduction speed table. In this table, the file names are sorted according to the reduction ranking shown in FIG. 13 and the data reduction speed is set correspondingly to a combination of a file name and a reduction process. Here, processes P1, P2, P3 and P4 correspond to identification information for the reduction processes 91 shown in FIG. 16. For example, when "File7" of the first rank is processed by the process P1, data is reduced at a rate of 29K bytes per second.

Figure 24:
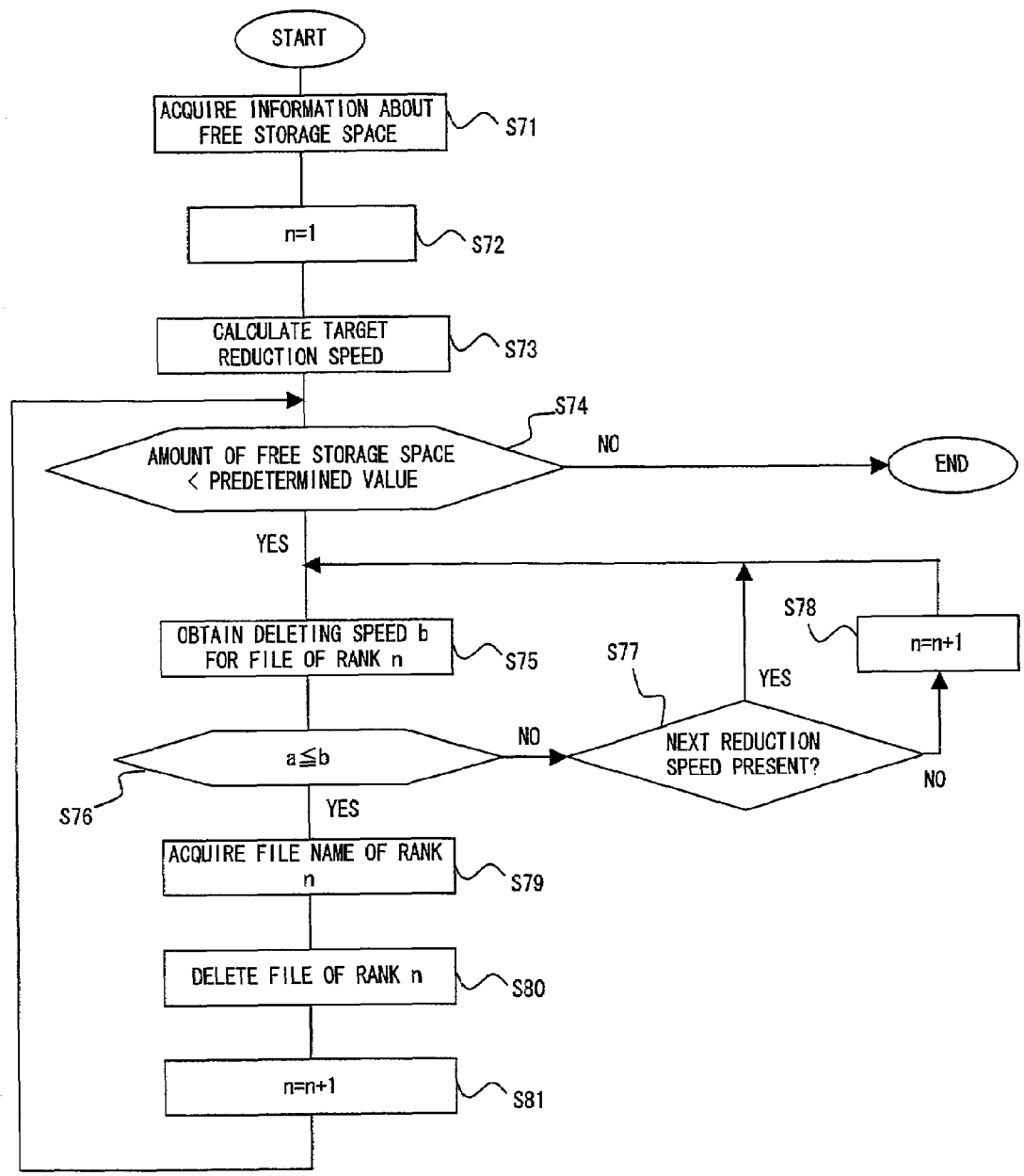
FIG. 24 is a flowchart of the fifth reduction processing.

FIG. 24 is a flowchart for the reduction processing using such a reduction speed table. The data reduction section 45 calculates a target reduction speed, then makes a comparison between the target reduction speed and each reduction speed entered into the table and determines a combination of a reduction process and a file of the reduction target.

The data reduction section 45 acquires information about free storage space in the storage section 42 (step S71) and then initializes the counter n, indicating the reduction ranking, to one (step S72).

Next, a target reduction speed a required to make up a shortage of storage space is calculated based on the set waiting time (step S73). For example, with a waiting time of 20 seconds and a shortage of 500K bytes, the reduction speed a is calculated by $a$=shortage of storage space/waiting time =500 Kb/20 s =25 Kb/s Next, a comparison is made between the amount of free storage space and a predetermined value (step S74). If the amount of free storage space is less than the predetermined value, then reference is made to the reduction speed table to obtain the reduction speed corresponding to the first reduction process for a file of rank n and the value of the reduction speed is set in b (step S75). A comparison is then made between a and b (step S76).

If a is more than b, the reduction speed associated with that reduction process is less than the target reduction speed and hence reference is made to the reduction speed table to check whether the reduction speed associated with the next reduction process has been entered (step S77). If so, it is acquired (step S75) and step S76 is then repeated. On termination of comparison of the target reduction speed with the reduction speeds associated with all the reduction processes, n is incremented by one (step S78) to repeat the procedure beginning with step S75 for the next file.

If a is not more than b in step S76, then the file name corresponding to rank n is acquired (step S79). Data in the file is reduced by the reduction process corresponding to the reduction speed b (step S80). Next, n is incremented by one (step S81) and the procedure then goes to step S74. The procedure is repeated until the decision in step S74 indicates that the amount of free storage space has reached the predetermined value.

Note that the reduction speed table need not necessarily be provided and information concerning the reduction speeds for the files may be added to the file reduction ranking table. In this case, the data reduction section 45 will perform the reduction processing while referring to the file reduction ranking table instead of the reduction speed table.

According to the present invention, a storage device for information equipment is provided which permits data of high importance to be retained on a preferential basis and the limitation on its storage capacity to be concealed.

What is claimed is:

1. A data storage device in an information equipment, comprising:
   a data storage unit storing a plurality of files each having a plurality of attributes;
   a rule setup unit storing a ranking rule for ranking the files for each of the attributes;
   an assignment unit assigning reduction ranking to each of the files on the basis of ranking rules associated with the attributes;
   a reduction unit reducing data in each file according to the reduction ranking when a storage capacity of the data storage unit is insufficient for new data storage; and
   a data reduction speed storage unit storing data reduction speed for each of a plurality of combinations of a reduction processing algorithm and a file whose data is to be reduced, and wherein the reduction unit calculates a target reduction speed and makes a comparison between the target reduction speed and the data reduction speed stored in the data reduction speed storage unit to determine a combination of a reduction processing algorithm and a file whose data is to be deleted,
   wherein the rule setup unit further stores application ranking of each of the ranking rules associated with the attributes, and the assignment unit applies the ranking rules in the application ranking order to determine the reduction ranking of the files.

2. The data storage device according to claim 1, wherein the rule setup unit further stores weight information for each of the attributes, and the assignment unit calculates the total of the attributes of each file on the basis of the weight information and determines the reduction ranking of the files on the basis of the total of the attributes.

3. The data storage device according to claim 1, further comprising an edit unit editing information stored in the rule setup unit.

4. The data storage device according to claim 1, further comprising a reduction ranking storage unit storing the reduction ranking of the files, and wherein the assignment unit determines the reduction ranking during an idle time in processing associated with the data storage unit and stores the reduction ranking in the reduction ranking storage unit.

5. The data storage device according to claim 1, wherein the data storage unit includes a buffer area into which data is written temporarily when the storage capacity is insufficient, and the reduction unit reduces data in each file after data has been written into the buffer area.

6. A data storage device in an information equipment, comprising:
- a data storage unit storing a plurality of files each having a plurality of attributes;
- a rule setup unit storing a ranking rule for ranking the files for each of the attributes;
- an assignment unit assigning reduction ranking to each of the files on the basis of ranking rules associated with the attributes;
- a reduction unit reducing data in each file according to the reduction ranking when a storage capacity of the data storage unit is insufficient for new data storage;
- a data reduction speed storage unit storing data reduction speed for each of a plurality of combinations of a reduction processing algorithm and a file whose data is to be reduced, and wherein the reduction unit calculates a target reduction speed and makes a comparison between the target reduction speed and the data reduction speed stored in the data reduction speed storage unit to determine a combination of a reduction processing algorithm and a file whose data is to be deleted; and
- a restoration unit restoring a data-deleted file to the original file, and wherein the data storage unit stores a virtual file containing file information of the original file and link information that points to real data of the data-deleted file and the restoration unit restores the data-deleted file to the original file on the basis of information in the virtual file.

7. A data storage device in an information equipment, comprising:
- a data storage unit storing a plurality of files each having a plurality of attributes;
- a rule setup unit storing a ranking rule for ranking the files for each of the attributes;
- an assignment unit assigning reduction ranking to each of the files on the basis of ranking rules associated with the attributes;
- a reduction unit reducing data in each file according to the reduction ranking when a storage capacity of the data storage unit is insufficient for new data storage; and
- a data reduction speed storage unit storing data reduction speed for each of a plurality of combinations of a reduction processing algorithm and a file whose data is to be reduced, and wherein the reduction unit calculates a target reduction speed and makes a comparison between the target reduction speed and the data reduction speed stored in the data reduction speed storage unit to determine a combination of a reduction processing algorithm and a file whose data is to be deleted.

8. A computer-readable recording medium recorded with a program for a computer, the program causing the computer to perform:
- assigning reduction ranking to each of a plurality of files on the basis of ranking rules associated with attributes of the respective files;
- storing application ranking of each of the ranking rules associated with the attributes;
- storing a data reduction speed for each of a plurality of combinations of a reduction processing algorithm and a file whose data is to be reduced; and
- reducing data in each of the files according to the reduction ranking when a data storage capacity is insufficient for new data storage,
- wherein the reducing applies the ranking rules in the application ranking order to determine the reduction ranking of the files, and
- wherein said reducing data includes at least one of file deletion, data compaction, document summarization, and file saving.

9. A computer readable storage medium encoded with processing instructions received via a propagation signal propagating a program to a computer, the program causing the computer to perform:
- assigning reduction ranking to each of a plurality of files on the basis of ranking rules associated with attributes of the respective files;
- storing application ranking of each of the ranking rules associated with the attributes;
- storing a data reduction speed for each of a plurality of combinations of a reduction processing algorithm and a file whose data is to be reduced; and
- reducing data in each of the files according to the reduction ranking when a data storage capacity is insufficient for new data storage,
- wherein the reducing applies the ranking rules in the application ranking order to determine the reduction ranking of the files, and
- wherein said reducing data includes at least one of file deletion, data compaction, document summarization, and file saving.

10. A computer implemented data reduction method comprising:
- setting up a ranking rule for ranking a plurality of files for each of attributes of the files;
- assigning reduction ranking to each of the files on the basis of ranking rules associated with the attributes;
- storing a data reduction speed for each of a plurality of combinations of a reduction processing algorithm and a file whose data is to be reduced; and
- reducing data in each of the files according to the reduction ranking when a data storage capacity is insufficient for new data storage,
- wherein the reducing applies the ranking rules in the application ranking order to determine the reduction ranking of the files, and
- wherein said reducing data includes at least one of file deletion, data compaction, document summarization, and file saving.

11. A computer implemented data storage method, comprising:
- ranking stored files using ranking rules that consider plural file attributes;
- determining whether data storage capacity will be exceeded when a new file is to be stored;
- storing application ranking of each of the ranking rules associated with the attributes;
- storing a data reduction speed for each of a plurality of combinations of a reduction processing algorithm and a file whose data is to be reduced;
- reducing a storage space needed for a file with the highest rank until the new file can be stored; and
- storing the new file,
- wherein the reducing applies the ranking rules in the application ranking order to determine the reduction ranking of the files, and
- wherein said reducing includes at least one of file deletion, data compaction, document summarization, and file saving.

* * * * *